(12) United States Patent
Potargent

(10) Patent No.: US 12,296,510 B2
(45) Date of Patent: *May 13, 2025

(54) SYSTEM AND METHOD FOR ROTATIONAL MOULDING

(71) Applicant: AMS Belgium, Bilzen (BE)

(72) Inventor: Johan Potargent, Bilzen (BE)

(73) Assignee: AMS Belgium, Bilzen (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,342

(22) Filed: Aug. 10, 2023

(65) Prior Publication Data

US 2023/0382021 A1 Nov. 30, 2023

Related U.S. Application Data

(62) Division of application No. 17/607,444, filed as application No. PCT/IB2020/053721 on Apr. 20, 2020, now Pat. No. 11,738,484.

(30) Foreign Application Priority Data

May 2, 2019 (BE) .................................. 2019/5292

(51) Int. Cl.
*B29C 41/46* (2006.01)
*B29C 33/02* (2006.01)
(Continued)

(52) U.S. Cl.
CPC .............. *B29C 41/46* (2013.01); *B29C 33/02* (2013.01); *B29C 41/04* (2013.01); *B29C 41/042* (2013.01);
(Continued)

(58) Field of Classification Search
CPC ............ B29C 41/04–06; B29C 41/042; B29C 41/045; B29C 41/047
See application file for complete search history.

(56) References Cited

U.S. PATENT DOCUMENTS 3,372,820 A * 3/1968 Barnett .................. B22D 13/10
425/182
3,416,193 A * 12/1968 Freeborn ................. B29C 33/04
425/143
(Continued)

FOREIGN PATENT DOCUMENTS

BE 1027595 B1 4/2021
BR PI1102873 A2 * 6/2013 ........... B29C 35/007
(Continued)

*Primary Examiner* — Atul P. Khare
(74) *Attorney, Agent, or Firm* — N.V. Nederlandsch Octrooibureau

(57) ABSTRACT

A system for the production of an object from a material containing a hardenable base material by rotational moulding includes a die having die walls surrounding a cavity wherein an object is to be formed, the die being provided with a flow channel for conducting a heat exchange fluid and heating or cooling the die, a rotation device for rotating the die, for bringing melted base material into contact with the die walls surrounding the die cavity and forming the object by rotational moulding, and thermal assemblies comprising a heating assembly and a cooling assembly for promoting flow of heat exchange fluids through the flow channel.

18 Claims, 3 Drawing Sheets

Figure 1:
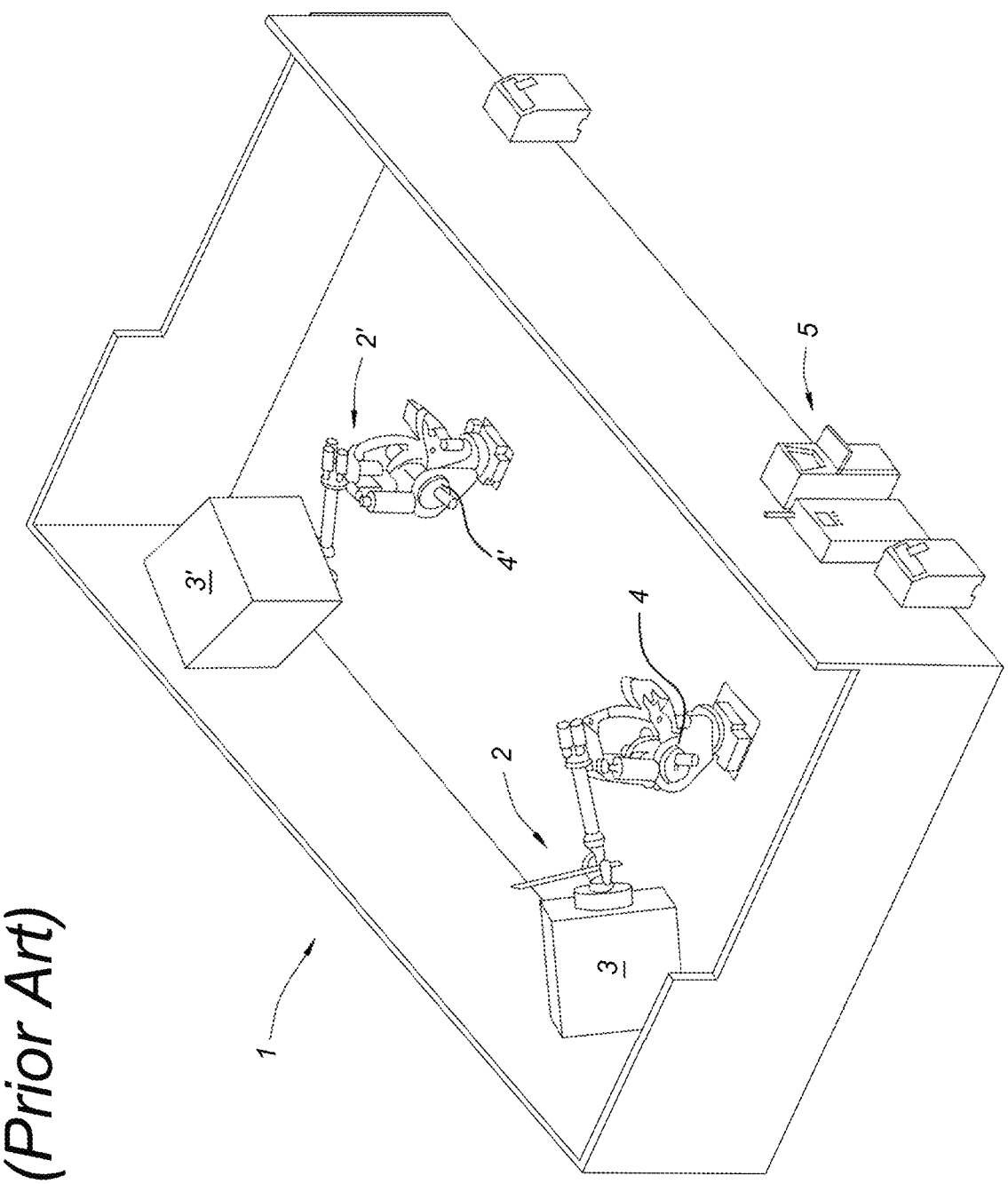

(51) Int. Cl.
  *B29C 41/04* (2006.01)
  *B29C 41/38* (2006.01)
  *B29C 41/50* (2006.01)
  *B29C 41/52* (2006.01)

(52) U.S. Cl.
  CPC .............. *B29C 41/38* (2013.01); *B29C 41/50* (2013.01); *B29C 41/52* (2013.01)

(56) References Cited

U.S. PATENT DOCUMENTS

| | | | | |
|---|---|---|---|---|
| 3,525,098 | A | * | 8/1970 | Vox ....................... B29C 35/007 425/425 |
| 3,574,245 | A | | 4/1971 | Dohm |
| 3,880,227 | A | * | 4/1975 | Bauer .................... B29C 41/46 165/254 |
| 6,555,037 | B1 | | 4/2003 | Payne |
| 9,327,431 | B2 | | 5/2016 | Kuijt et al. |
| 2006/0088622 | A1 | * | 4/2006 | Persico ................... B29C 41/04 425/435 |
| 2007/0063061 | A1 | * | 3/2007 | Nagasaka ........... B29C 45/7306 236/68 B |
| 2021/0187799 | A1 | | 6/2021 | Moran |
| 2021/0350051 | A1 | | 11/2021 | Potargent |
| 2021/0354341 | A1 | | 11/2021 | Potargent |

FOREIGN PATENT DOCUMENTS

| | | | | |
|---|---|---|---|---|
| DE | 202008018363 | U1 | * 8/2013 | ........... B29C 35/007 |
| EP | 1649997 | A1 | 4/2006 | |
| GB | 1101519 | A | 1/1968 | |
| SU | 1736721 | A1 | * 5/1992 | ............ B29C 41/06 |
| WO | 2013164765 | A2 | 11/2013 | |
| WO | 2018069459 | A1 | 4/2018 | |

* cited by examiner

SYSTEM AND METHOD FOR ROTATIONAL MOULDING

The present invention relates to a system for producing an object from a material that contains a hardenable base material using rotational moulding, wherein the system is comprised of a robotic arm and a die that can be attached to the robotic arm. The die contains a die cavity defined by a die wall, wherein the die is configured for receiving the material in the die cavity. The current invention also involves a method for production of an object of a material containing a hardenable base material using rotational moulding.

State of the Art of Technology

A similar system is known from BE 1020382 A5. Known technologies for rotational moulding fill a die with a quantity of material, after which the die is placed in a kiln for heating and smelting of the material. As soon as the plastic has melted, the die is rotated and possibly agitated to achieve the desired distribution of the melted material in the die. After that, the die is cooled and the moulded object is removed from the die.

In known systems, the die is cooled using ventilation or by using a coolant. For example, EP 1.649997 A1 published a die for rotational moulding in which a liquid channel for heated and cold liquids is integrated directly into the die wall.

Objective of the invention

One objective of the invention may be to create a system of the type named above that does not display at least one of the disadvantages of the state of the art of technology. An additional objective of the invention may be to create a system of the type listed above that can shorten production time, in particular the time to heat and/or cool the material.

DESCRIPTION OF THE INVENTION

This objective is achieved, according to the invention, with a system that displays the technical characteristics of the first independent claim.

In a first aspect of the invention, which may occur in combination with the other aspects and designs of the invention described here, the invention includes a system for producing an object from a material that contains a hardenable base material using rotational moulding, i.e. The tension-free heating material, for example, a thermoplastic, in a die into a product formed by rotation. The system includes an assembly of a die and rotation assemblies for moving the die, wherein the die is in a heat exchange relationship with, and is preferably equipped with a flow channel for the heating or cooling of the die with a first connection for the addition of a heat exchange medium or heat exchange fluid, preferably a heat exchange fluid, on one end of the flow channel, an on the other end of this flow channel there is a second connection for draining of the heat exchange fluid.

The system also includes a thermal assembly for the flow of the heat exchange fluid through the flow channel. The thermal assembly includes a heat exchange fluid store and a connector for connecting the thermal assembly to at least one of the connections on the flow channel. The connector is attached at one end to the heat exchange fluid store and the free end has a connector for attaching the connector to at least one of the connections on the flow channel.

Through the presence of the thermal assembly, it is possible to provide a greater throughput of fluid with regard to the flow channels provided in the rotation assemblies, such as a robot or a robotic arm, where the available internal space is limited by the presence of electrical elements, such as electrical wiring and insulation elements to protect the electrical elements. Furthermore, according to the invention, it is also possible to add a thermal assembly to an existing system without additional changes being required to the rotation assemblies.

The thermal assembly may also contain positioning equipment for positioning the connector assemblies with regard to at least one connection. The positioning equipment may be laid out to move the connectors to the fixed end or to rotate the connector and connection assemblies around a rotation point R near the fixed end of the connector. Through the presence of the positioning equipment, it is possible to line up the connection assemblies and the at least one connection accurately so that the connection can be made efficiently.

In a first design according to the invention, the connection assemblies and at least one connection form a swivel joint. The swivel joint can be designed, for example, as a rotating joint, in particular with rotoglyde connection assemblies, or a ball joint, preferably a flexible ball joint, wherein the connection assemblies contain the ball of the ball joint and at least one connection has a complementary recipient to receive the ball.

In a second design according to the invention, the connector is floating, preferably at the height h with regard to the foot of the rotation assemblies.

In a third design according to the invention, the thermal assembly contains a thermal source and a heat exchanger using which the thermal source, such as a heat source or a cooling source, and the heat exchange fluid store are arranged in a heat exchanging relationship with each other. With this it is possible to use separate circuits to use the heat exchange fluid as a coolant or heating agent depending on the thermal source connected, in particular depending on the temperature of the heat exchange medium created by the thermal source with regard to the temperature of the material or the moulded object.

In designs according to the invention, the system can contain multiple dies connected in a mobile manner to the rotation assemblies and/or multiple thermal assemblies.

In a second aspect of the invention, which may arise in combination with the other aspects and designs of the invention described here, the invention contains a thermal assembly controlling the flow of a heat exchange medium through a flow channel for heating or cooling a die as defined above.

In a third aspect of the invention, which may arise in combination with the other aspects and designs of the invention described here, the invention includes a method for controlling the flow of a heat exchange fluid through a flow channel of a die for the heating or cooling of the die in the system described for it, including the positioning of the connection assemblies with regard to at least one connection, for example the movement of the connection assemblies toward the fixed end of the connector and/or rotation of the connector around a rotation point R near the fixed end of the connector.

In designs according to the invention, the method includes the alignment of the connector using rotation with the at least one connection, the telescopic extension of the connector and connection of the connection assemblies to the free end of the connector with at least one connection.

SUMMARY DESCRIPTION OF THE FIGURES

The invention will be explained in more detail using a design shown in the figure.

Figure 2:
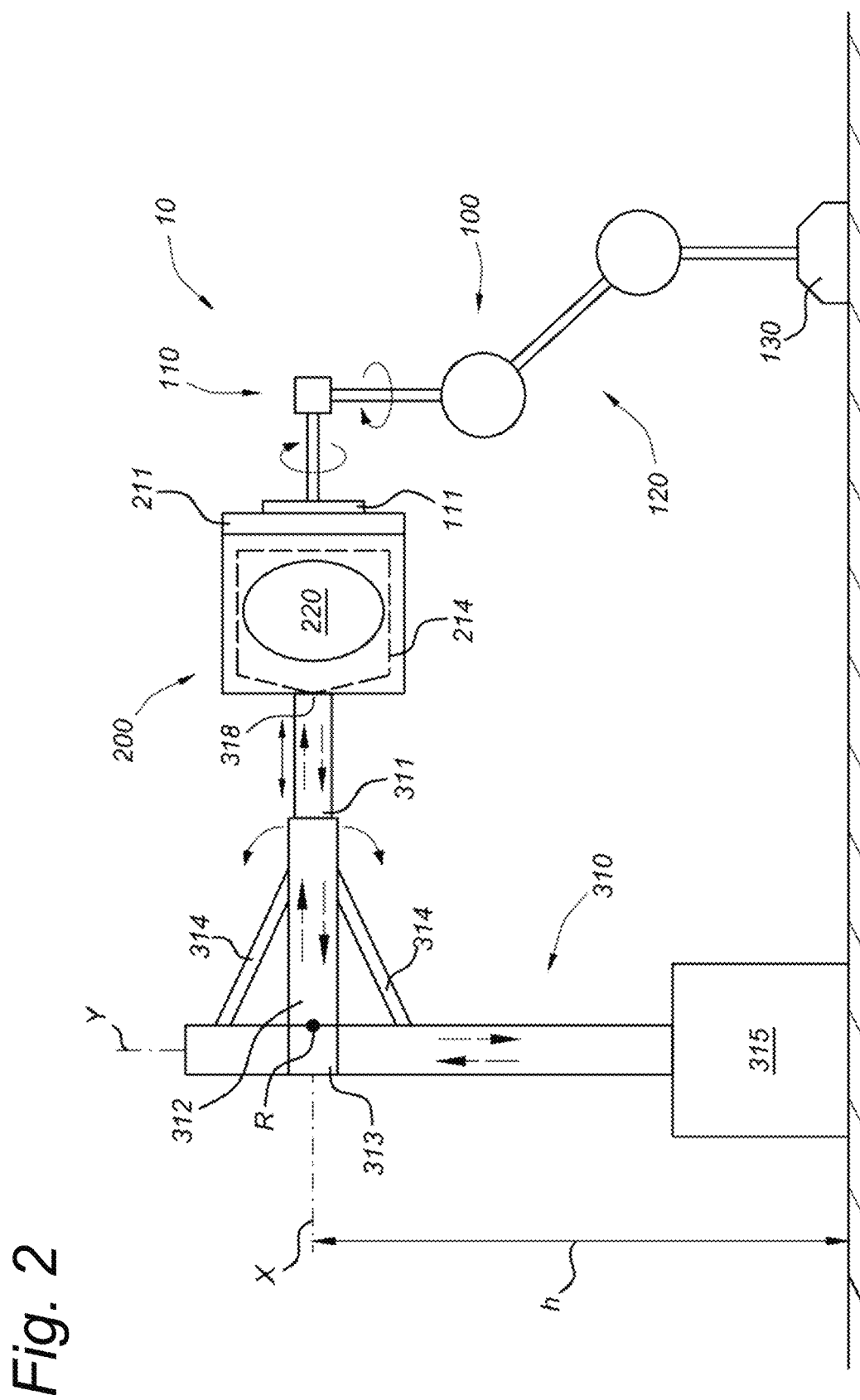
Figure 3:
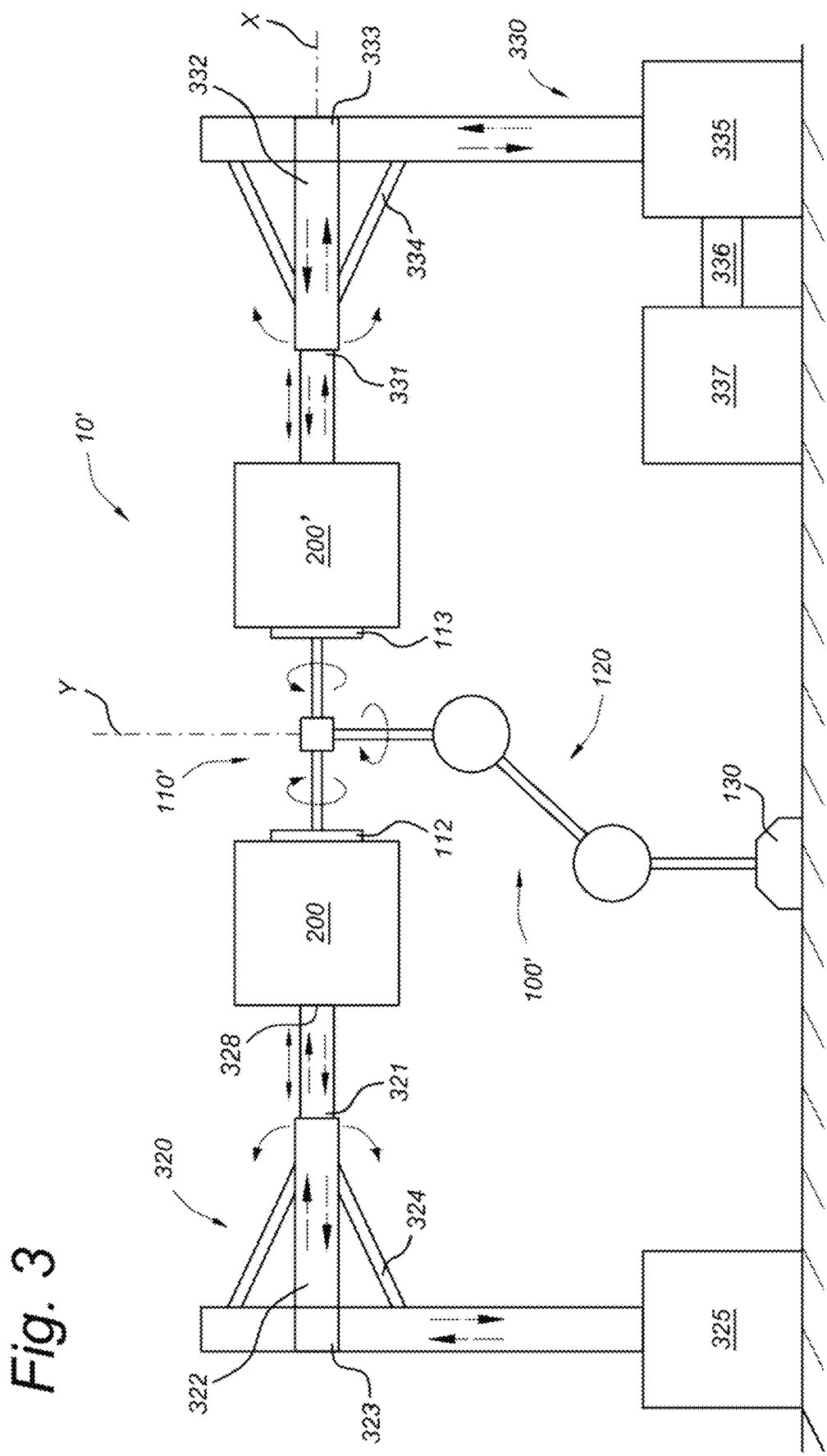

FIG. 1 shows a simplified presentation in perspective of a system according to the state of the art of technology; and FIGS. 2 and 3 show schematic cross sections of a system according to a first and second design of the current invention.

DETAILED DESCRIPTION OF THE FIGURES

The current invention will be described with regard to particular designs and with reference to certain figures, but the invention is not limited to these and is only determined by the claims. The figures described are only schematic and non-limiting. In the figures, the size of certain element is exaggerated and not drawn to scale for illustrative purposes. The dimensions and the relative dimensions are not necessarily consistent with actual practical designs of the invention.

In addition, the terms first, second, third and the like are used in the description and claims to differentiate between similar elements and not necessarily to describe a sequential or chronological sequence. The terms are interchangeable under fitting circumstances and the designs of the invention can be applied in sequences other than those described or illustrated here.

In addition, the terms, top, bottom, over, under and the like in the description and claims are used for illustrative purposes and not necessarily to describe relative positions. The terms used are interchangeable under fitting circumstances and the designs of the invention described can be applied in other orientations than described or illustrated here.

Furthermore, the various designs, even though called "preferred designs" must be considered rather as a manner of example of how the invention can be designed than as a limitation of the range of the invention.

The term "comprising", used in the claims, must not be interpreted as being limited to the resources or steps listed after it. The term does not exclude other elements or steps. The term should be interpreted as specifying for the presence of the listed features, elements, steps or components which are referenced, but does not exclude the presence or addition of one or more other features, elements, steps or components or groups thereof. The range of the expression "a design comprising resources A and B" must thus not be limited to designs that consist only of A and B. The intention is that, with regard to the current invention, only the components A and B of the design are summarized, and the claim must be further interpreted as they also contain equivalents of these components.

The systems shown in the figures are rotational moulding systems or elements for these, to produce an item made of a material containing a hardenable base material using rotational moulding.

In the text below, a material referred to as containing a hardenable base material is plastic. However, it must be clear that a hardenable base material can be thermoplastics, thermoset resins, metal, chocolate, fat or any other material that can be moulded or attached using rotational moulding. In particular, composite or fibre reinforced plastic materials or materials consisting of combinations of thermoset materials and fibre materials, such as "short", "long" or "prepreg" carbon fibres.

FIG. 1 shows a known system for rotational moulding. The system 1 shown contains multiple assemblies 2, 2' for rotational moulding and a central control unit 5 for the controlling of the assemblies 2, 2'. Each assembly 2, 2' includes a die 3, 3' and a robot or robotic arm 4, 4' to receive the die 2, 2' on a free end.

The functionality of such a system includes in the first step the filling of the die cavity in the die with a pre-weighed quantity of base material, such as in powder form, after which the die is closed. In a subsequent second step, thee die filled with base material is heated to a desired temperature, such as a pre-determined melting temperature of the base material. While heating the die, the die is rotated around its vertical and/or horizontal axis so that the melting base material is brought into contact with the internal walls of the die surrounding the die cavity. The die continues to rotate until all of the base material in it is melted and evenly structured and distributed. In a subsequent third step, the die is cooled with air, water or a combination of the two. In this way, the die and the melted layer of base material are cooled, after which the die is opened and the moulded product removed. After this, the die can be filled again and the process started from the beginning.

FIGS. 2 and 3 display systems 10, 10' for producing a plastic object using rotational moulding according to the designs of the invention. The systems displayed 10, 10' include a robot 100 and a die 200 equipped with a flow channel 214 with an input connection on one end of the flow channel and a drain connection on the other end of the flow channel. The system 10, 10' also include at least one thermal assembly 310, 320, 330 for input and drainage of a heat exchanging fluid, such as a coolant, on the connections of a flow channel in or around the die wall of the die 200.

The robot 100 shown includes a robotic arm 110 and a robotic foot 130 connected using a robot body 120. The robotic arm 110 is equipped for connection to at least one die 200.

The die 200 shown includes a defined cavity 220 through a die wall 210 and the flow channel 214. The die 200 is connected to the robotic arm 110 using coupling elements 111, 211. In the design shown, the coupling elements are designed as complementary coupling elements, with a first coupling element 111 on the robotic arm 110 and a second coupling element 211 on the die 200.

Additional possible designs of the die 200 according to the invention are described in WO 2018/69459A1, which is wholly included here as a reference.

The thermal assembly 310 shown in FIG. 2 includes a telescopic connector 311, 312 for input of a heat exchange liquid to the input connection of the flow channel 214 ad for draining a heat exchange liquid from the drain connection of the flow channel, and a booster 313 for promoting the flow of the heat exchange liquid through the connector 311, 312 and the flow channel 214. On the free end 318 of the connector 311, 312, there are coupling elements for connecting the connector 311, 312 to the input and drain connections of the flow channel 214.

The thermal assembly 310 shown here also has positioning elements 314, for example, actuators or (hydraulic) cylinders for positioning the connector on the die 200. The positioning elements 314 can be arranged to turn around the connector toward a rotation point R. In particular, it is possible to turn the connector 311, 312 over an angle of 25° on the XZ plane vertically on the Y axis and over an angle of 50° in the XY plane. The thermal assembly 310 shown also has a heat exchange liquid store 315 in fluid connection with the booster 313, the connector 311, 312 and the coupling elements.

The functionality of such an assembly includes in a first step the pulling out or extending the telescopic part 311 of the connector when the input and drain connections of the die 200 are within range. In a second step, the coupling elements are attached to the free end 318 of the connector 311, 312 with the connections, such as using a flexible ball coupling in which the free end 318 is equipped with the ball and the connection of a complementary recipient for receiving the ball.

The system 10' shown in FIG. 3 according to a second design of the invention includes multiple thermal assemblies according to the invention in the form of a heating element 320 provided in a first position for the heating of the die 200 and a cooling system 330 in a second position for cooling the die 200'. In particular, the first and second positions are on opposite sides to the robot 100' as shown in FIG. 3. The robot 100' is equipped with a robotic arm 110' with multiple coupling elements 112, 113 and connected with these to the dies 200, 200' to form an object from a hardenable base material.

The thermal assemblies 310, 320, 330 shown can also include a cooling or heat source 337 for the direct or indirect cooling or heating off the heat exchange liquid using a heat exchanger 336.

In designs not shown, the system 10, 10' may also include an input assembly to input the first material that contains a first plastic into the die cavity 220 of one or more dies 200, 200' for moulding an object. The assembly may include two or more base material inputs, wherein a first input assembly is provided for the supply of the first die 200 with a first base material and a second input assembly is provided for the supply of a second die 200' with a second base material.

LIST WITH REFERENCE NUMBERS

10. System for rotational moulding
100, 100'. Robot
110, 110'. Robotic arm
120 Robot body
130. Robot foot
200, 200'. Die
310, 320, 330. Thermal assembly
311, 321, 331. Telescopic part of the connector
312, 322, 332. Fixed part of the connector
313, 323, 333. Booster
314, 324, 334. Positioning elements
315, 325, 335. Heat exchange fluid store
336. Heat exchanger
337. Thermal source
318, 328. Free end of the connector

The invention claimed is:

1. A system for the production of an object from a material containing a hardenable base material by rotational moulding, the system comprising:
    a die having die walls surrounding a cavity wherein an object is to be formed, the die being provided with a flow channel for conducting a heat exchange fluid and heating or cooling the die,
    a rotation device for rotating the die, for bringing melted hardenable base material into contact with the die walls surrounding the die cavity and forming the object by rotational moulding, and
    thermal assemblies for controlling flow of heat exchange fluids through the flow channel, wherein the flow channel of the die has a first connection for supplying a respective one of the heat exchange fluids to the die and a second connection for draining off the respective heat exchange fluid from the die, wherein the heat exchange fluids are selected from a heating fluid and a cooling fluid, and
    wherein said thermal assemblies comprise:
        a heating assembly configured to connect to the flow channel from a first position with respect to the rotation device and provided for controlling flow of the heating fluid through the flow channel and thereby heating the die upon connection of the heating assembly to the flow channel, and
        a cooling assembly configured to connect to the flow channel from a second position different from the first position with respect to the rotation device and provided for controlling flow of the cooling fluid through the flow channel and thereby cooling the die upon connection of the cooling assembly to the flow channel.

2. The system according to claim 1, wherein each of the heating assembly and the cooling assembly comprises a heat exchange fluid store for storing a supply of the respective heat exchange fluid.

3. The system according to claim 1, wherein the heating assembly and the cooling assembly are located on opposite sides of the rotation device.

4. The system according to claim 1, wherein each of the heating assembly and the cooling assembly comprises a connector for connecting the respective heating assembly and cooling assembly to at least one of the first and second connections of the flow channel, the connector comprising a fixed end connected to a heat exchange fluid store of the respective heating assembly and cooling assembly and a movable end equipped with coupling elements for connecting the connector to the at least one of the first and second connections of the flow channel.

5. The system according to claim 4, wherein each of the heating assembly and the cooling assembly further comprises a positioning device for positioning the coupling elements with respect to the at least one of the first and second connections of the flow channel.

6. The system according to claim 5, wherein each of the connectors is telescopic and wherein each of the positioning devices is provided for moving a telescopic part of the respective connector.

7. The system according to claim 5, wherein each of the positioning devices is arranged to rotate the respective connector around a rotation point R located near the fixed end of the respective connector.

8. The system according to claim 7, wherein each of the positioning devices is arranged to rotate the respective connector at a maximum over an angle of 25-50° towards a central axis (X) of the respective connector.

9. The system according to claim 4, wherein the coupling elements of each of the respective connectors and the at least one of the first and second connections form a ball joint, wherein the coupling elements of each of the respective connectors contain the ball of the ball joint, and wherein the at least one of the first and second connections has a complimentary ball recipient of the ball joint.

10. The system according to claim 1, wherein the first and second connections are arranged at one side of the die and wherein coupling elements for coupling the die to the rotation device are arranged at an opposite side of the die.

11. The system according to claim 1, wherein the rotation device is a robotic arm.

12. The system according to claim 1, wherein the die is one of multiple dies that are movably attached to the rotation device.

13. The system according to claim 12, wherein the dies are located on opposite sides of the rotation device.

14. A thermal assembly for promoting flow of a heat exchange fluid through a flow channel for heating or cooling of a die, the thermal assembly forming part of a system defined according to claim 1 as one of the heating assembly and the cooling assembly.

15. A method for the production of an object from a material containing a hardenable base material by rotational moulding using the system according to claim 1, the method comprising the steps of:

filling the die cavity with the hardenable base material;

moving the die to the first position and heating the material to a first predetermined temperature by promotion of the flow of the heating fluid through the flow channel;

rotating the die by the rotation device in such a way that the object is moulded from the material; and moving the die to the second position and cooling the material to a second predetermined temperature by promotion of the flow of the cooling fluid through the flow channel.

16. The method according to claim 15, wherein the die is detached from the rotation device during the cooling step.

17. The method according to claim 15, comprising, prior to the step of filling the die cavity, preheating the die to a third predetermined temperature lower than the first predetermined temperature.

18. The method according to claim 17, wherein the die is detached from the rotation device during the preheating step.

* * * * *